US00RE43034E

(19) United States
(12) Reissued Patent
Aoyama et al.

(10) Patent Number: US RE43,034 E
(45) Date of Reissued Patent: Dec. 20, 2011

(54) INTAKE CONTROL APPARATUS FOR AN ENGINE AND METHOD

(75) Inventors: Shunichi Aoyama, Yokosuka (JP); Shinichi Takemura, Yokosuka (JP); Ryosuke Hiyoshi, Yokosuka (JP)

(73) Assignee: Nissan Motor Co., Ltd., Yokohama (JP)

(21) Appl. No.: 12/951,545

(22) Filed: Nov. 22, 2010

Related U.S. Patent Documents

Reissue of:
(64) Patent No.: 7,640,901
Issued: Jan. 5, 2010
Appl. No.: 11/712,322
Filed: Feb. 28, 2007

(30) Foreign Application Priority Data

Mar. 1, 2006 (JP) ..... 2006-054605

(51) Int. Cl.
*F01L 1/34* (2006.01)

(52) U.S. Cl. ..... 123/90.16; 123/90.15; 123/348

(58) Field of Classification Search ..... 123/90.15, 123/90.16, 90.17, 90.18, 345, 346, 347, 348, 123/406.23, 406.35
See application file for complete search history.

(56) References Cited

U.S. PATENT DOCUMENTS

| | | | | |
|---|---|---|---|---|
| 5,450,824 | A | 9/1995 | Yamane et al. | |
| 5,682,854 | A | 11/1997 | Ozawa | |
| 5,797,368 | A | 8/1998 | Kreuter et al. | |
| 6,732,682 | B2 * | 5/2004 | Aoyama et al. | 123/48 B |

FOREIGN PATENT DOCUMENTS

| | | | |
|---|---|---|---|
| DE | 39 26 796 | A1 | 2/1991 |
| EP | 0 764 770 | A2 | 3/1997 |
| EP | 0 945 606 | A2 | 9/1999 |
| EP | 1 223 319 | A1 | 7/2002 |
| EP | 1 363 002 | A1 | 11/2003 |
| JP | 55-087835 | | 7/1980 |
| JP | S55-087835 | | 7/1980 |

OTHER PUBLICATIONS

Isuzu Ceramics Research Institute Co, Ltd., Combustion and Combustion Chamber for Heat Insulating Engines, Japanese Society of Mechanical Engineering Lecture Articles, No. 961-1m 1996.

Article entitled "Combustion and Combustion Chamber for Heat Insulating Engines" published in Japanese Society of Mechanical Engineers Lecture Articles, No. 96-1, 1996.

* cited by examiner

*Primary Examiner* — Ching Chang
(74) *Attorney, Agent, or Firm* — Global IP Counselors, LLP

(57) ABSTRACT

An engine intake control apparatus for an engine that comprises at least one combustion chamber operatively connected to an intake port and an intake valve associated with each intake port, wherein the intake valve is adapted to open and close the intake port is disclosed herein. The intake control apparatus comprises a variable valve operating mechanism and a controller. The variable valve operating mechanism is configured and arranged to selectively change a valve closing timing and a valve lift amount of the intake valve. The controller is configured and arranged to control the variable valve operating mechanism when the engine is in a low load condition. The valve closing timing is determined such that an actual compression ratio of the engine is reduced relative to the actual compression ratio when the engine is operating in a high load condition. The valve lift amount is smaller when the engine is in the low load condition relative to the valve lift amount when the engine is in the high load condition. A method for controller an engine is also disclosed.

15 Claims, 9 Drawing Sheets

Degradation of combustion due to a drop in compression temperature
Top dead center
Pump loss reduction
Position of piston where compression begins
1000
100
10
50
100
1000
Cylinder volume V (cc)
In-cylinder gas pressure P (kPa)

Vital control
TDC
BDC

Fixed
TDC
0
40
BDC
Effective compression ratio
10 → 5

INTAKE CONTROL APPARATUS FOR AN ENGINE AND METHOD

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from Japanese Patent Application Ser. No. 2006-054605 filed Mar. 1, 2006, the disclosure of which, including its specification, drawings and claims, are incorporated herein by reference in its entirety.

TECHNICAL FIELD

The present disclosure pertains to an intake control apparatus for an engine equipped with variable valve devices. More specifically, the present disclosure relates to a cooling loss reduction technology for an engine.

BACKGROUND

An intake controller is known in which timing for opening intake valves is substantially fixed, and the effective intake stroke is variably regulated by altering the timing for closing the intake valves based on an engine load in an attempt to reduce the pumping loss. Such an intake controller is disclosed in published Japanese Patent Application No. 55-87835.

However, in the intake controller disclosed published Japanese Patent Application No. 55-87835, because the timing for closing the intake valves comes significantly ahead of bottom dead center BDC in the intake stroke, the intake air in the cylinders expands adiabatically to bottom dead center BDC despite the suction stroke, so that the temperature inside the cylinders also drops as the pressure inside the cylinders drops. Although the compression stroke begins once bottom dead center BDC is passed, because almost nothing but adiabatic expansion and compression are present until the in-cylinder pressure at which the adiabatic expansion began is reached, that is, the in-cylinder pressure has merely been restored; the actual compression begins from the point at which the in-cylinder pressure is restored. Thus, the actual compression ratio drops significantly as the timing for closing the intake valves comes further ahead of bottom dead center BDC. Because this drop in the actual compression ratio results in a significant drop in the temperature of the air-fuel mixture inside the cylinders at compression top dead center TDC, the combustion rate drops due to the deteriorated combustion state. According, fuel economy is adversely impacted.

Also, when the timing for closing the intake valves is advanced in an engine equipped with a variable valve operating mechanism, it is feasible to improve the thermal efficiency of the engine by adhering a heat insulating material on the wall surfaces of the combustion chambers, partially or entirely, to prevent the pumping loss reduction effect from being lost. However, because the heat transfer rate increases when heat insulating materials, such as ceramic material, are used, at a high temperature generated at high engine load, the temperature of the intake air inside the combustion chambers increases so that undesirable knocking occurs. In addition, intake air filling efficiency at high load is also essential in that the volume of air is decreased to the extent that the temperature of the intake air increases, and a tradeoff occurs, resulting in a drop in torque

SUMMARY

An engine intake control apparatus for an engine that comprises at least one combustion chamber operatively connected to an intake port and an intake valve associated with each intake port, wherein the intake valve is adapted to open and close the intake port is disclosed herein. The intake control apparatus comprises a variable valve operating mechanism and a controller. The variable valve operating mechanism is configured and arranged to selectively change a valve closing timing and a valve lift amount of the intake valve. The controller is configured and arranged to control the variable valve operating mechanism when the engine is in a low load condition. The valve closing timing is determined such that an actual compression ratio of the engine is reduced relative to the actual compression ratio when the engine is operating in a high load condition. The valve lift amount is smaller when the engine is in the low load condition relative to the valve lift amount when the engine is in the high load condition. A method for controller an engine is also disclosed.

BRIEF DESCRIPTION OF DRAWINGS

Other features and advantages of the present disclosure will be apparent from the ensuing description, taken in conjunction with the accompanying drawings, in which.

DETAILED DESCRIPTION

Figure 1:
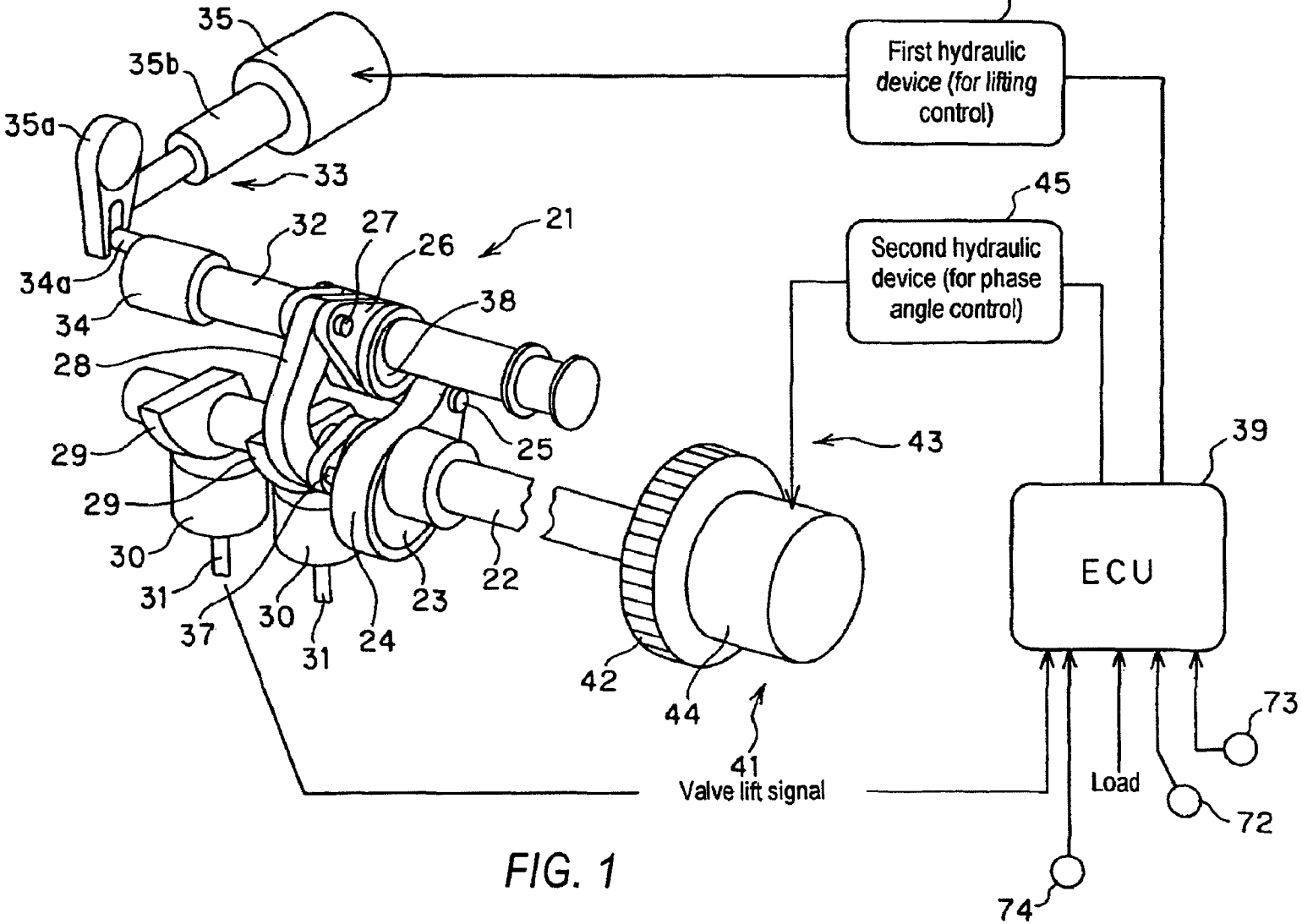
FIG. 1 is a schematic perspective view of a variable valve operating mechanism.

While the claims are not limited to the illustrated embodiments, an appreciation of various aspects of the apparatus is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

Figure 3:
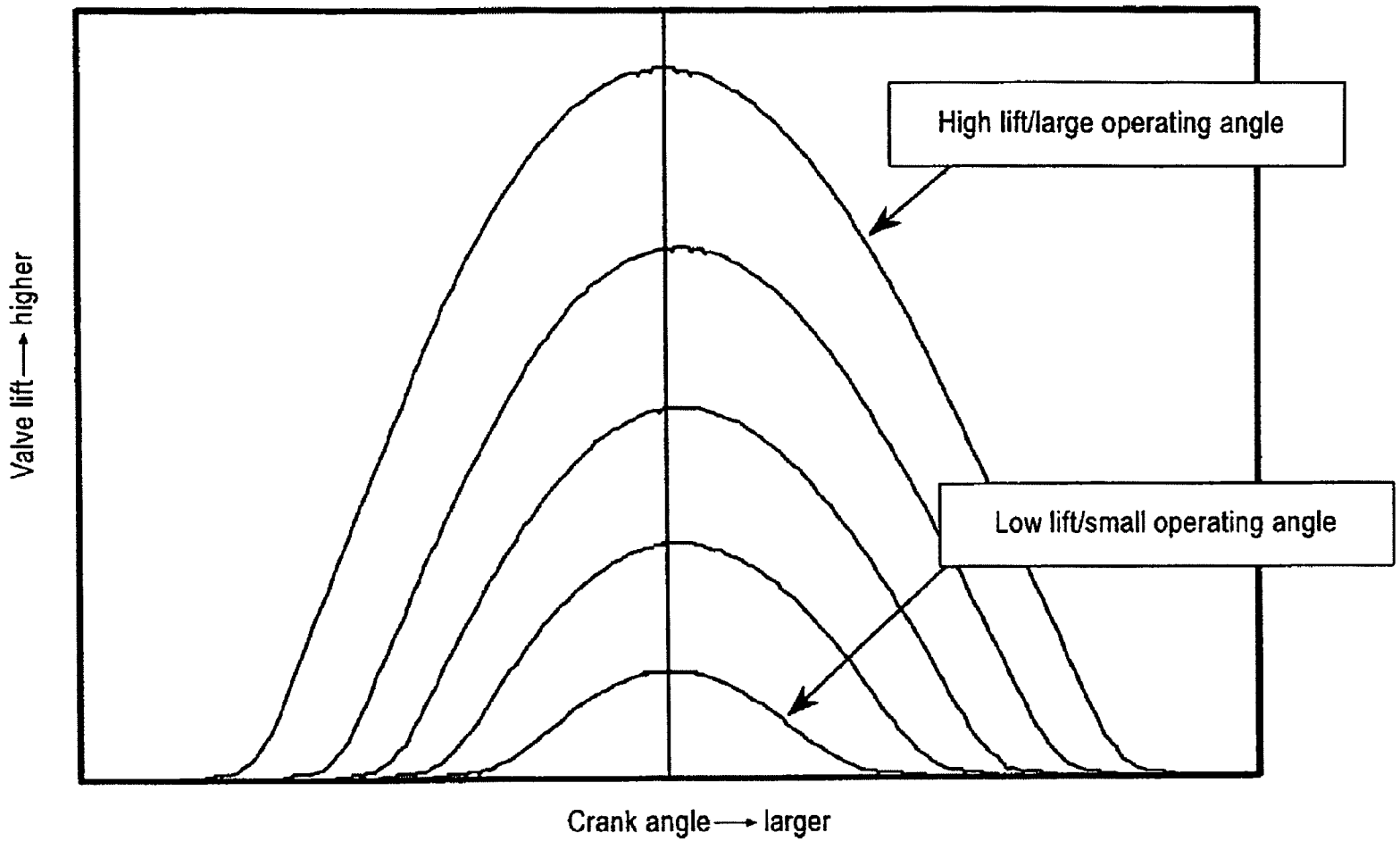
FIG. 3 is a chart illustrating the valve lifting characteristics of intake valves.

FIG. 1 is a perspective view of a configuration of a variable valve operating mechanism that serves as an engine intake control device according to a first embodiment. More specifically, FIG. 3 is a perspective schematic view of the variable valve operating mechanism that includes a variable lift mechanism 21 and a variable phase mechanism 41. The variable lift mechanism 21 can selectively lift intake valves with the variable phase mechanism 41 (variable timing mechanism for intake valve closing) that may change the phase (phase with respect to the crankshaft) of a crank angular position at which maximum lift of the intake valves is attained to either an advancing side or delaying side. (This crank angular position of the intake valves will hereafter be referred to as the "intake valve lift center angle.")

Figure 2A:
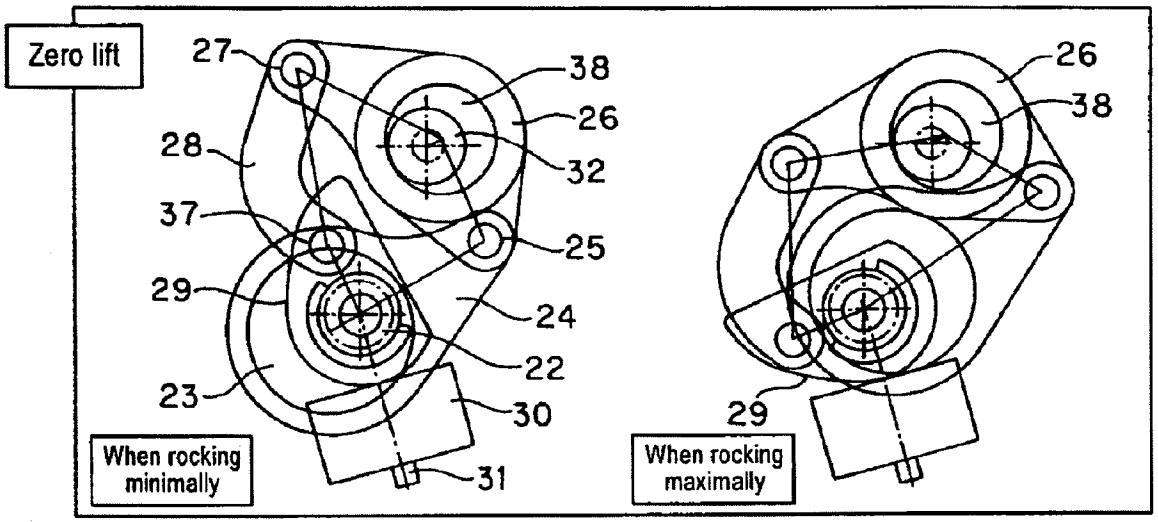
FIGS. 2A-2B are schematic cross-sectional views illustrating the operation of the variable valve operating mechanism of FIG. 1.
Figure 2B:
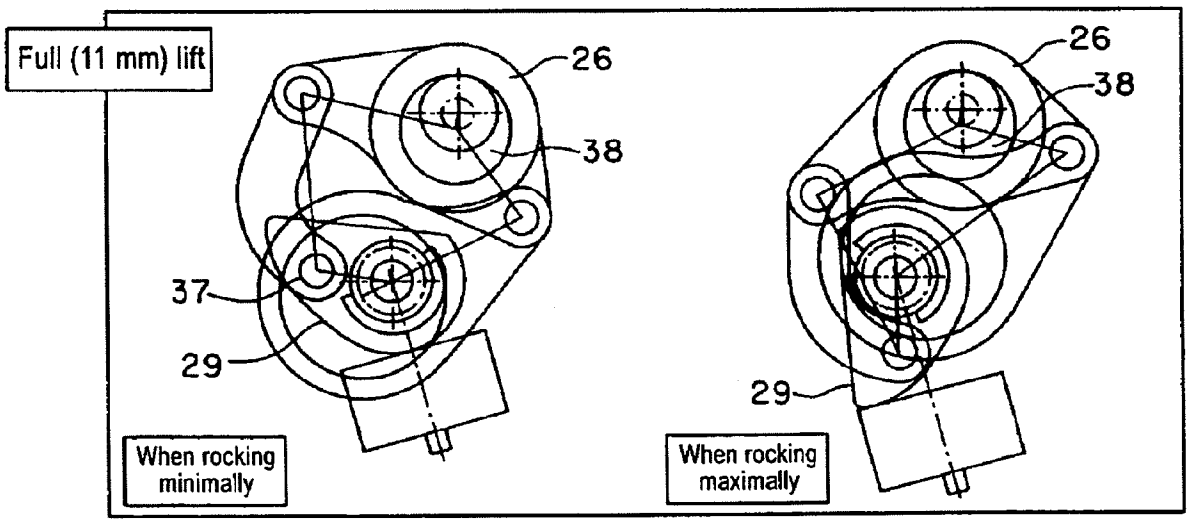

FIGS. 2A and 2B are schematic cross sectional views of variable lift mechanism 21. FIG. 2A shows a maximum and minimum rocking position of a rocking cam 29, to be described later, at a zero lift position of an intake valve 31. FIG. 2B shows the maximum rocking and minimum rocking position of rocking cam 29, to be described later, at a full lift position of the intake valve. As used herein, zero lift of the intake valve means that intake valve 31 is not lifted at all (that is, the lift of the intake valve is zero), and full lift of the intake valve means that intake valve 31 is fully lifted.

The variable valve operating mechanism 21 similar to that illustrated in FIGS. 2A and 2B was previously proposed in published Japanese Patent Application Nos. 2001-051422 and 11-107725, both of which are commonly owned by Nissan Motor Ltd, the owner of the present application and the details of which are incorporated herein by reference in their entireties. A brief overview of the variable valve operating mechanism 21 will now be described.

First, variable lift mechanism 21 will be explained. Variable lift mechanism 21 is equipped with intake valves 31, a driving shaft 22, a first eccentric cam 23, a control shaft 32, a rocker arm 26 and rocking cams 29. The intake valves 31 connect to a cylinder head (not shown) in a freely slidable fashion. The driving shaft 22 is supported in a freely rotatable fashion on cam brackets (not shown) provided at a top of the cylinder head. The eccentric cam 23 is fixed to the driving shaft 22 by press fitting. The control shaft 32 is provided parallel to the driving shaft 22 while supported in a freely rotatable fashion above said driving shaft 22 using the same cam brackets that support the driving shaft 22. The rocker arm 26 is supported in a freely rockable fashion by a second eccentric cam 38 that is connected to the control shaft 32. The rocking cams 29 make contact with valve lifters 30 provided on a top of the intake valves 31. The eccentric cam 23 and rocker arm 26 are linked together by a linking arm 24. The rocker arm 26 and rocking cams 29 are linked together by linking member 28.

In FIG. 1, only one cylinder portion of a multi-cylinder internal combustion engine that is equipped with two (2) intake valves per cylinder is represented. Therefore, two (2) intake valves 31, valve lifters 30, and rocking cams 29 are illustrated.

As will be described in greater detail below, the driving shaft 22 is driven via a timing chain or a timing belt by a crankshaft of the engine, as is conventional in the art.

The first eccentric cam 23 has a generally cylindrical outer peripheral surface and defines and axis extending therethrough. The axis of the first eccentric cam 23 is offset from an axial center of the driving shaft 22 by a predetermined amount. A substantially annular portion of the linking arm 24 is rotatably fitted onto the cylindrical outer surface of the first eccentric cam 23.

The rocker arm 26 is slidably supported generally at its center by the second eccentric cam 38. The arm portion of the linking arm 24 is linked at a first end of the rocker arm 26 (the right end in the diagram on the left side of FIG. 2A) using a linking pin 25. A top part of the linking member 28 is linked to a second end of the rocker arm 26 (the left end in the figure on the left side of FIG. 2A) using a linking pin 27. The second eccentric cam part 38 defines an axis extending therethrough. The axis of the second eccentric cam part 38 is offset from an axial center of control shaft 32. Thus, the rocking center of the rocker arm 26 may be changed by varying the angular position of the control shaft 32.

Rocking cams 29 are fitted and supported around the circumference of driving shaft 22 such that rocking cams 29 are free to rotate. A bottom portion of the linking member 28 is mechanically linked to a portion of a rocking cam 29 using a linking pin 37. The rocking cams 29 include an arc-shaped base surface, which forms an arc that is concentric to driving shaft 22, and a cam surface, which extends from said arc-shaped base surface such that it forms a predetermined shaped curve. The base surface and cam surface of the rocking cams 29 are formed continuously on the bottom surface of the rocking cams 29. The arc-shaped base surfaces and the cam surfaces are designed to be brought into abutting contact with a designated position of the top surfaces of the valve lifters 30, depending on the angular position of the rocking cams 29. That is, the arc-shaped base surfaces comprise base circle zones where the amount of lift of the intake valves 31 (and the operating angle of the intake valves) becomes zero and the intake valves 31 are moved downward when the cam surfaces make contact with the valve lifters 30 as the rocking cams 29 rock. Furthermore, small ramp zones are formed between the base circle zones and the lift zones.

As shown in the embodiment depicted in FIG. 1, the control shaft 32 is configured such that it is rotated within a predetermined angular range by a lift controlling actuator 33 that is provided at one end of the control shaft 32. The lift controlling actuator 33 comprises pin 34a, a hydraulic actuator 35, and a first hydraulic device 36. The pin 34a is formed as a part of a member 34 that is provided at a rear end of the control shaft 32. The pin 34a protrudes from a position that is offset from the axial center of the control shaft 32 by a predetermined amount.

The hydraulic actuator 35 rotates the control shaft 32 as it engages the pin 34a with a beak-shaped claw 35a provided at the front end of a plunger 35b. The first hydraulic device (for example, a hydraulic control valve) 36 regulates the hydraulic pressure to be applied to the hydraulic actuator 35. The first hydraulic device 36 is controlled by control signals from an engine control unit 39. The angle of the control shaft 32 rotation is detected by control shaft sensors, not shown.

The operation of the variable lift mechanism 21 will now be described. When the driving shaft 22 is rotated by the crankshaft, the linking arm 24 moves in the vertical direction due to the cam function of first eccentric cam 23. This action causes the rocker arm 26 to rock accordingly. The rocking of the rocker arm 26 is transmitted to the rocking cams 29 via the linking member 28 so as to rock the rocking cams 29. The valve lifters 30 are thereby depressed due to the cam function of the rocking cams 29, such that the intake valves 31 are moved downward.

When the angle of rotation of the control shaft 32 is changed via the lift controlling actuator 33, the initial position of the rocker arm 26 changes. Accordingly, the initial rocking position of the rocking cams 29 is also changed.

For example, as is also shown in FIG. 2A, when second eccentric cam 38 is positioned at a top position in the figure, the rocker arm 26 as a whole is positioned at a top position, and the end part on the linking pin 37 side of the rocking cam 29 is pulled relatively upward. That is, the initial position of the rocking cams 29 is tilted in the direction to move the cam surfaces away from the valve lifters 30, as shown in the left side of FIG. 2A. Therefore, when the rocking cams 29 rock in conjunction with the rotation of the driving shaft 22, the arc-shaped base surfaces of the rocking cams 29 remain in contact with the valve lifters 30 for a relatively long time, while the time period during which the cam surfaces remain in contact with valve lifters 30 is relatively brief. The overall amount that the intake valves 31 are moved is therefore reduced, as may be seen, for example, in the right side of FIG. 2B. The crank angular zones of the intake valves 31 (i.e., the operating angle of the intake valves), that is, from when the intake valves open until they close, are also reduced.

Conversely, as is also shown in FIG. 2B, when the second eccentric cam 38 is positioned at a bottom position, the rocker arm 26 as a whole is positioned at a bottom position, and the end part of the rocking cam 29 on the linking pin 37 side is pressed relatively downward. That is, the initial position of the rocking cams 29 is tilted in a direction to move the cam surfaces closer to the valve lifters 30, as may be seen in the left side of FIG. 2B. Therefore, when the rocking cams 29 rock in conjunction with the rotation of the driving shaft 22, the position where the rocking cams 29 make contact with the valve lifters 30 moves immediately from the arc-shaped base surfaces to the cam surfaces. The overall amount the intake valves 31 are lifted is therefore increased, as may be seen in viewing the right side of FIG. 2B. The operating angle of the intake valves 31 is also effectively increased.

Because the initial position of the second eccentric cam 38 may be changed continuously, the valve lifting characteristics of the intake valves 31 accordingly change continuously. That is, as shown in FIG. 3, the lifting of both intake valves 31 (the amount of lift for intake valves 31 and the operating angle of intake valves 31) can be increased or decreased simultaneously. Although the configuration of each part, for example, determines how much the lift of the intake valves 31 and the operating angle of the intake valves 31 are increased or decreased, the timings for opening and closing the intake valves 31 change almost symmetrically.

Next, as also shown in FIG. 1, the variable phase mechanism 41 will now be described. The variable phase mechanism 41 comprises a sprocket 42 and a phase regulating actuator 43. The sprocket 42 is provided at a front end of the driving shaft 22. The phase regulating actuator 43 rotates the sprocket 42 and the driving shaft 22 relative to each other within a predetermined angular range. The sprocket 42 is mechanically linked to the crankshaft via a timing chain or a timing belt, not shown.

In the embodiment shown, the phase regulating actuator 43 comprises a hydraulic rotary actuator 44 and a second hydraulic device (for example, a hydraulic control valve) 45 that is used for controlling the hydraulic supply pressure to the hydraulic actuator 44. The second hydraulic device 45 is controlled by control signals received from an engine control unit 39. The phase regulating actuator 43 functions to rotate the sprocket 42 and the driving shaft 22 relative to each other so as to advance or delay the lift center angle of the intake valves 31 relative to the crank angle. That is, the overall angle is advanced or delayed without changing the lifting characteristics of the intake valves 31 (i.e., no valve-lift change and no working-angle change). In addition, the changes toward the advancing or delaying side of the lift center angle can be realized continuously. The control state of the variable phase mechanism 41 is detected by driving shaft sensors, not shown, and corresponds to a given rotational position of the driving shaft 22.

In the embodiment shown, the control of variable lift mechanism 21 and variable phase mechanism 41 are not limited to a closed loop control based on the values detected by the respective driving shaft sensors. It is understood that a simple open loop control can be affected according to a given driving condition.

In the embodiment shown, it is desirably that the valve lifters 30 have a known hydraulic valve clearance regulating mechanism. Such a mechanism assists in maintaining the valve clearance substantially at zero at all times.

In an engine equipped with the above-described variable valve operating mechanisms (i.e., each comprising a variable lift mechanism 21 and a variable phase mechanism 41), the amount of intake air is regulated by regulating the opening and closing of the intake valves 31 without dependence on a throttle valve. In the present embodiment, it is desirable that a slight vacuum exists in the intake system to re-circulate blow-by gas. Thus, although it is not shown, it is also desirable to provide an appropriate throttle mechanism or a flow-constricting mechanism in place of a throttle valve at an upstream side of an intake path to create the vacuum.

A characteristic of the above-described variable lift mechanism 21 is that as the timing for closing the intake valves 31 changes, the timing for opening the intake valves 31 also changes, as illustrated in FIG. 3. (The timing for opening the intake valves 31 is delayed as the timing for closing the intake valves 31 is advanced.) Thus, the variable lift mechanism 21 is used in combination with the variable phase mechanism 41 to enable opening and closing control of the intake valves 31 at an arbitrary crank angular position.

Figures 4A, 4B, 4C:
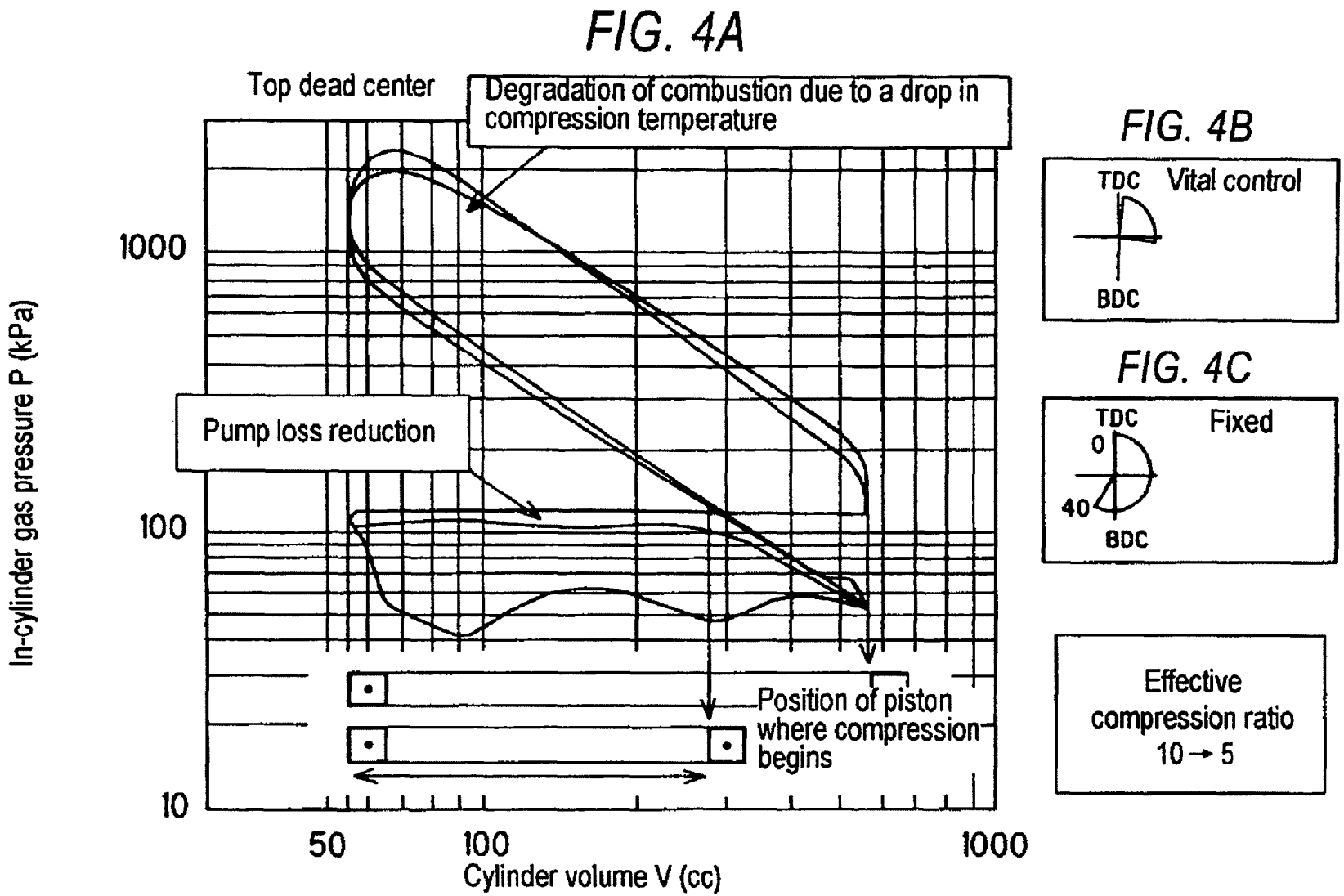
FIGS. 4A is a PV (in-cylinder gas pressure/cylinder volume) diagram illustrating the drop in the actual compression ratio associated with the reduction of pumping loss by regulating valve closing timing, and its effects.
FIGS. 4B and 4C illustrate different valve closing times.

Accordingly, the timing for closing the intake valves 31 while the engine load is low (i.e., during an idle condition) is controlled using the variable valve operating mechanism comprising the variable lift mechanism 21 and the variable phase mechanism 41 to reduce the operating angle of the intake valves 31 more significantly than in an engine for which the timing for closing the intake valves 31 is fixed (see, for example, FIG. 4(C)). The timing for closing the intake valves 31 is advanced as shown in FIG. 4(B), and suction is stopped during the suction stroke so as to expand or compress the intake air before and after the piston reached bottom dead center BDC. This is done to change the actual effective suction stroke so as to bring the pressure of the intake air at the time of suction closer to atmospheric pressure, in almost inverse proportion to the effective stroke, to effectively reduce a pumping loss. This phenomenon is well known as a Miller cycle.

Because the timing for closing intake valves 31 comes well ahead of bottom dead center BDC, the intake air inside the cylinders expands adiabatically to bottom dead center BDC despite the suction stroke, and the temperature inside the cylinders also drops as the in-cylinder pressure drops. Although the compression stroke begins once bottom dead center BDC is passed, almost nothing but adiabatic expansion and compression are present until the in-cylinder pressure at which the adiabatic expansion began is reached, that is, the in-cylinder pressure is merely restored. The actual compression therefore begins from the point at which the in-cylinder pressure is restored. Thus, the actual compression ratio drops significantly as the timing for closing the intake valves is further advanced. Because the drop in the actual compression ratio results in a significant drop in the temperature of the air-fuel mixture inside the cylinders at compression top dead center TDC, the combustion rate drops due to a deteriorated combustion state. The fuel economy therefore cannot be improved to the extent that pumping loss is reduced, as is illustrated in FIG. 4A.

Furthermore, in FIG. 4A, the timing for closing the intake valves 31 is shown by overlaying a PV curve for an engine in which it is fixed at a point delayed from bottom dead center BDC, as shown in FIG. 4C, with the PV curve for an engine in which the timing for closing the intake valves 31 is set ahead of bottom dead center BDC using the variable valve operating mechanism 21, as shown in FIG. 4B. Here, while the pumping loss is reduced when the timing for closing the intake valves 31 is advanced using the variable valve operating mechanism 21, the compression temperature drops, and the combustion state deteriorates. That is, there is a tradeoff between reduction of the pumping loss and deterioration of the combustion state due to a drop in compression temperature.

Figure 5B:
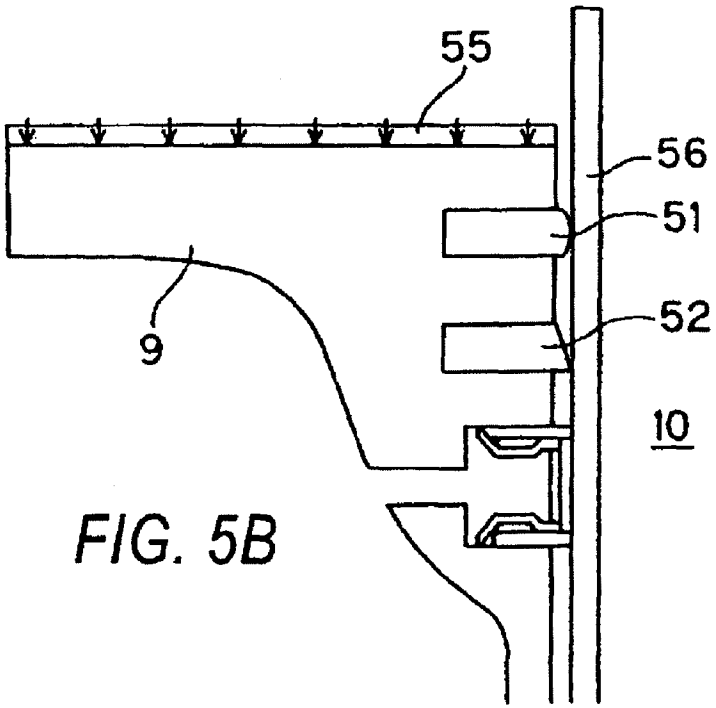
FIG. 5B is a partial cross section view of an adiathermic piston.

Thus, to keep the pumping loss reduction effect when the timing for closing intake valves 31 is advanced using the variable valve operating mechanism 21, a coating layer 55 made of a heat insulating (nonmetallic) material such as a ceramic material is formed in a layer having a predetermined thickness on the crown surface of a piston 9. The coating layer 55 may be applied by thermal spraying, as shown in FIG. 5B. Other suitable methods of applying coating layer 55 may also be employed. A cylinder liner 56 may also be provided. The cylinder liner 56 may also be made of the same heat insulating material (nonmetallic material) as used to form the coating layer 55, such as a ceramic material. The fact that the thermal efficiency of an engine can be improved by reducing cooling losses using a configuration comprising said heat insulating piston and the heat insulating material liner is well known.

Figure 5A:
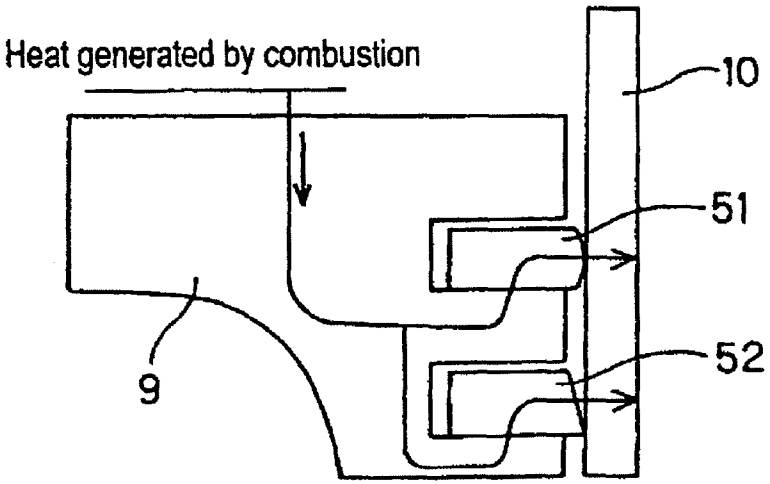
FIG. 5A is a partial cross section view of a prior art piston.

A prior art piston is shown in FIG. 5A. As is illustrated, the heat generated by combustion escapes from the piston 9 to the cylinder 10 through piston rings 51 and 52. In contrast, in the case where the piston and liner are constructed of an insulating material, such as a ceramic material, transmission of heat generated by combustion is prevented by the coating layer 55.

However, as described in an article entitled "Combustion and Combustion Chambers of Heat insulating Engines" published in the Japanese Society of Mechanical Engineers Lecture Articles, No. 96-1, 1996, the contents of which are incorporated herein by reference in its entirety, because, for example, the heat transfer rate of ceramic material increases at high temperatures, such as those that are present at high engine loads, the in-cylinder temperature increases, and knocking becomes inevitable. In addition, while intake air filling efficiency at high engine loads is essential, because the intake air temperature increases when heat insulating pistons 9 and heat insulating liners 10 are adopted, the volume of the air decreases to this extent, and a tradeoff, that is, a drop in torque, occurs.

Figure 6B:
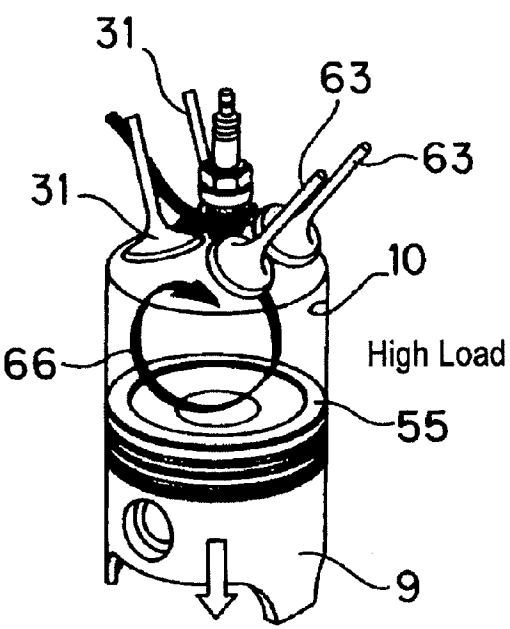
FIGS. 6A-6B are schematic perspective views of an engine illustrating cooling loss recovery through intake control using a variable valve operating mechanism.
Figure 6A:
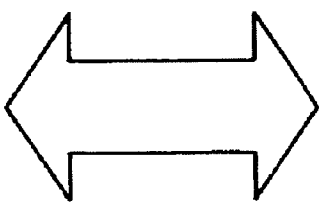
Figure 6A:
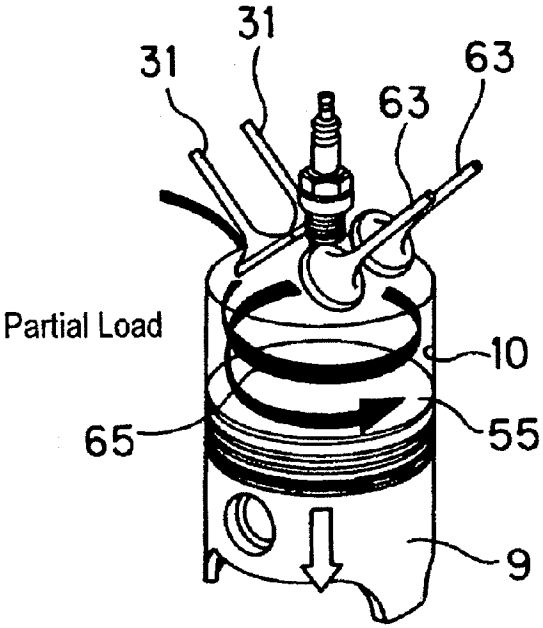
Figure 9B:
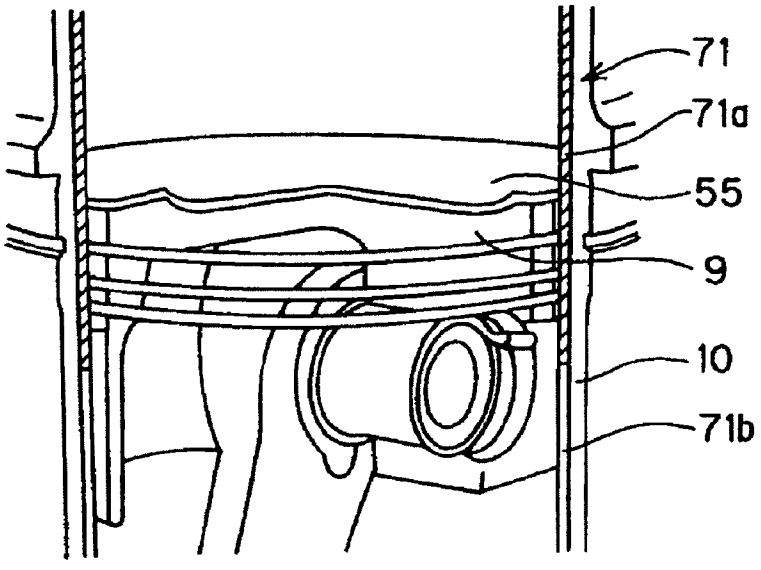
FIG. 9B is a schematic perspective view of a piston according to a second embodiment wherein a portion of a cylinder liner in a second embodiment is cut away.
Figure 9A:
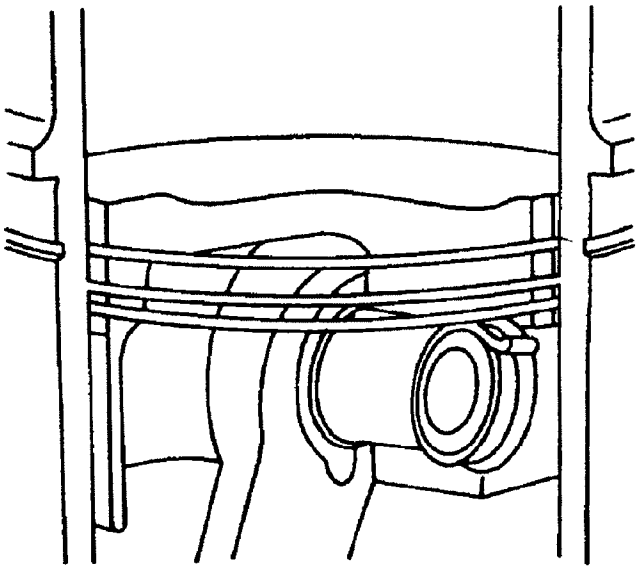
FIG. 9A is a schematic perspective view of a prior art piston.

In an embodiment of the present disclosure, as shown in FIGS. 9A and 9B, the following heat exchange control is affected to effectively eliminate the tradeoff between a drop in torque and an increase temperature. Basically, a ceramic (heat insulating) material is formed as a layer (see FIG. 6A, 7A) on the wall surfaces of a combustion chamber 61 (at least portions of piston 9, cylinder 10, cylinder head 62 (see FIG. 7A), intake valves 31, and exhaust valves 63) to reduce the cooling losses while at a low engine load, while at the same time storing part of the combustion heat in the ceramic material layer. The control is then effected using the variable valve operating mechanism comprising the variable lift mechanism 21 and the variable phase mechanism 41, such that the timing for closing intake valves 31 is set ahead of bottom dead center BDC of the intake stroke so as to reduce the actual compression ratio while at a low engine load (when a partial load is present) while minimizing the lift of the intake valves 31, and the intake air is turned into a high-speed wall flow 65 (that is, a swirl) along the wall surface of the cylinder 10 to retrieve heat from the wall surface of cylinder 10 (cylinder liner 56—the cylinder liner 56 may be seen in FIG. 5B, but has been eliminated in FIGS. 6A and 6B for clarity), as shown in FIG. 6A. An increase in the intake air temperature due to the heat retrieval from the wall surface of the high-temperature cylinder 10 becomes highly effective for offsetting the problematic drop in the actual compression ratio (when the pumping loss is reduced) as a result of the control that sets the timing for closing the intake valves 31 ahead of bottom dead center BDC of the intake stroke.

Conversely, when a high engine load is present, control is affected to increase the lift of the intake valves 31 to lessen the wall flow along the wall surface of cylinder 10 (cylinder liner 56). In other words, the control operates to form a wall flow 66 which does not pass along the wall surface of cylinder 10, as is shown in FIG. 6B. In the manner demonstrated in FIG. 6B, heat retrieval from the wall surface of cylinder 10 is avoided to limit the drop in filling efficiency and the occurrence of knocking which would be caused by temperature increase in the intake air at high engine load.

As described above, in the present embodiment, the lift of the intake valves 31 is minimized at low engine loads to facilitate the reduction of pumping loss by reducing the effective stroke. At a high engine loads the present embodiment takes advantage of the characteristic that increasing the lift of intake valves 31 gives a flow characteristic to the intake air that limits the exchange of heat with cylinder 10 to attempt to have the occurrence of knocking reduced and preventing a reduction of the filling efficiency at high engine load. That is, the system is configured so as to regulate the lift of the intake valves 31 in conjunction with the concept of reducing pumping loss.

Figure 7B:
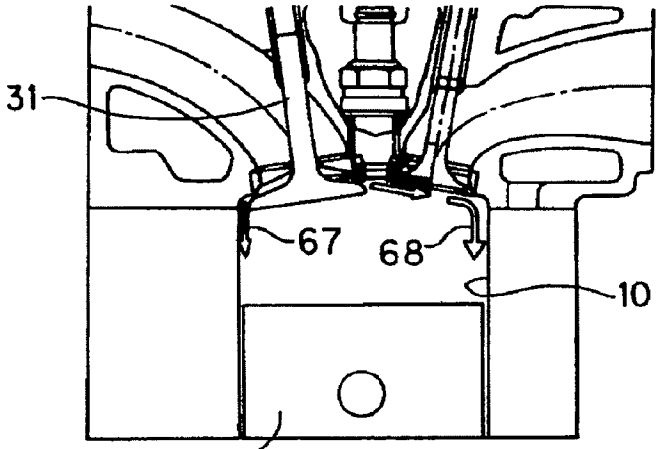
FIG. 7A-7C are schematic cross sectional views of an engine illustrating cooling loss recovery through intake control using a variable valve operating mechanism.
Figure 7C:
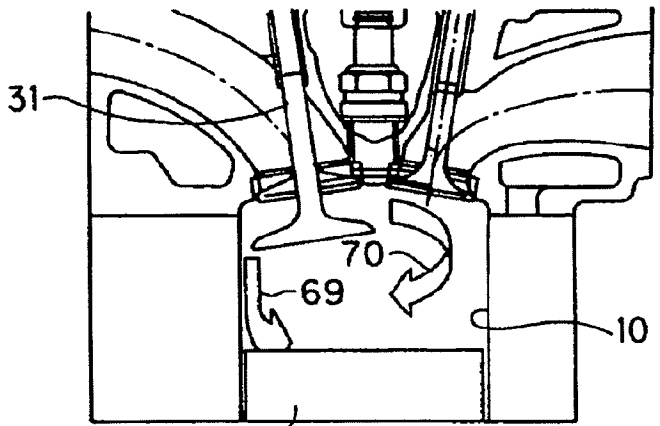
Figure 7A:
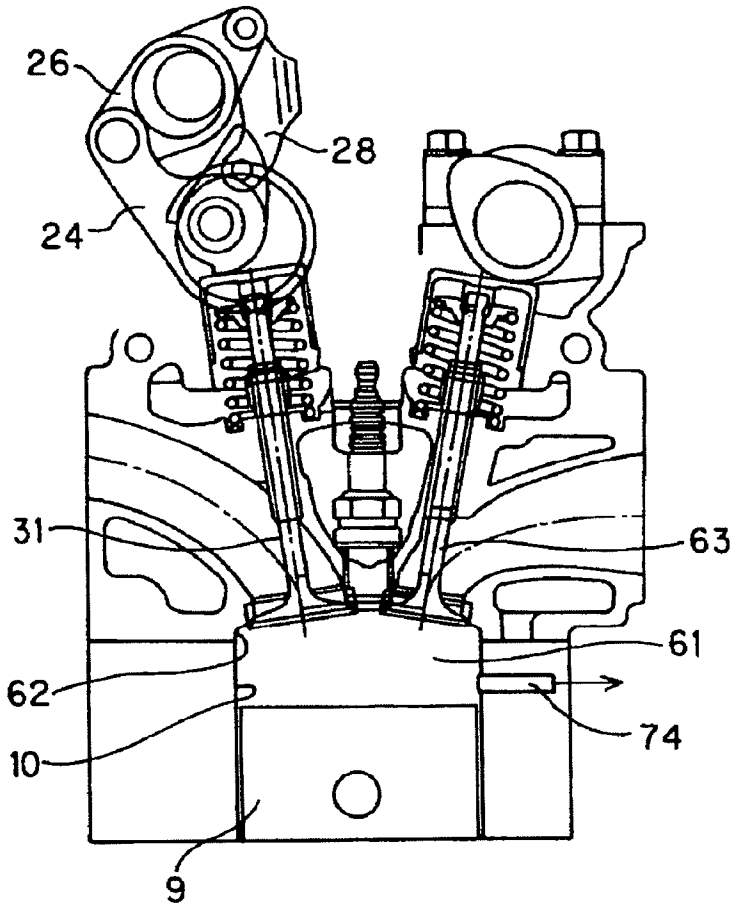

FIG. 7A is a schematic cross-sectional view of the entire system that includes not only the vicinity of combustion chamber 61, but also the variable valve operating mechanism when both the intake valve 31 and the exhaust valve 63 are closed. FIG. 7B illustrates the condition when the intake valve 31 is open at low engine load as opposed to FIG. 7C, which is a partial cross-sectional view of only the vicinity of combustion chamber 61 when the intake valve 31 is open at high engine load. In the case of the variable valve operating mechanism shown in FIG. 7A, however, it is important to note that the front and back views are reversed as compared to FIGS. 2A-2B. Also, the coating layer 55 and the cylinder liner 56 shown in FIG. 5B are not shown in FIGS. 7A-7B for the sake of clarity.

As shown in FIG. 7A, streams 67 and 68 of intake air are created along the wall surface of the cylinder 10 when the intake valve 31 is opened very little at low engine loads. The orientation of the streams 67 and 68 can be intensified by forming a wall portion at part of the intake valve seat circumference (not shown). An example of structure for such an arrangement may be found in U.S. Pat. No. 5,797,368, the contents of which is incorporated by reference in its entirety. Strong streams of air 67 and 68 close to the speed of sound are merged to form the high-speed wall flow 65 shown in FIG. 6A, and the flow 65 flows (becomes more likely to flow) along the ceramic-coated wall surface of cylinder 10, that is, along cylinder liner 56, so that the heat transfer rate between the intake air and the wall surface of the cylinder 10 becomes extremely high, and the intake air receives enough heat for sufficient temperature increase from heat exchange with the wall surface of the cylinder 10. Because the control is also affected to set the timing for closing the intake valve 31 ahead of the bottom dead center BDC of the intake stroke in the low engine load condition, the actual compression ratio is reduced as was described with reference to FIG. 4, so that effective combustion may be obtained without knocking. In addition, because of the heat insulating effect of the ceramic is also added during combustion, significant improvement of fuel consumption may also be realized.

Furthermore, due to the early disappearance of a quench layer during the engine warm-up due to the control of heat exchange between the intake air and the wall surface of cylinder 10, an HC reduction effect may also be expected.

However, as shown in FIG. 7C, the lift of the intake valve 31 is increased at high engine load to reduce the wall flows along the wall surface of cylinder 10, and the reduced streams 69 and 70 are merged to form the wall flow 66 that does not flow along the wall surface of cylinder 10 shown in FIG. 6B, thus preventing a drop in the filling efficiency and preventing the occurrence of knocking that would be caused by an increased temperature of the intake air at high engine load conditions.

Figure 8:
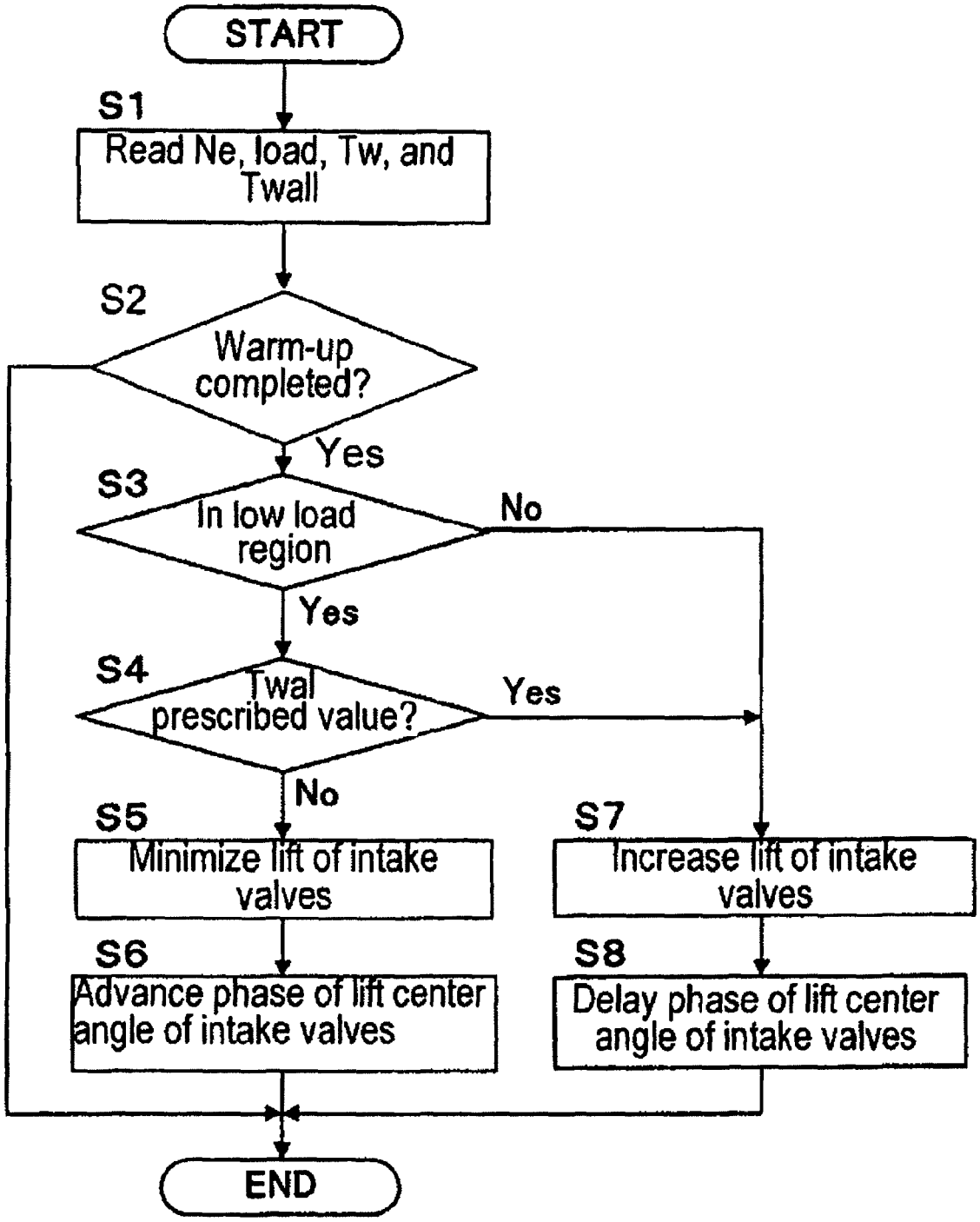
FIG. 8 is a flow chart explaining opening/closing control of intake valves using a variable valve operating mechanism.

The control affected by engine control unit 39 will now be explained with reference to the flow chart in FIG. 8. FIG. 8 illustrates the opening and closing control of the intake valves 31, and the control is executed at predetermined fixed time intervals (for example, in one embodiment, every 10 ms).

The process begin at Step I SI, where engine rotational speed Ne detected by a crank sensor (not shown), the engine load, the cooling water temperature Tw detected by a water temperature sensor (not shown), and the cylinder wall temperature Twall detected by a wall temperature sensor 74 (best seen in FIG. 7A) are read.

As shown in FIG. 7A, the wall temperature sensor 74 is attached to the wall surface of the cylinder 10 at a position near the cylinder head 62. With respect to the engine load, because a basic fuel injection pulse width Tp is computed based on the volume of intake air detected by an air flowmeter, not shown, and the engine rotational speed Ne for the flow (not shown in the figure) for executing fuel injection control, for example, the basic injection pulse width Tp should be used as the engine load. In one embodiment, oil temperature may be used in place of the cooling water temperature Tw detected by water temperature sensor 73.

Once the engine rotational speed Ne, the engine load, the cooling water temperature Tw, and the cylinder wall temperature Twall are read by the engine control unit 39, the process proceeds to Step 2 S2.

In Step 2 S2, the cooling water temperature Tw detected by the water temperature sensor 73 is compared to a predetermined value in order to determine whether warm-up of the engine has been completed. If cooling water temperature Tw exceeds the predetermined value, a decision is made that warm-up of the engine is complete, and the process flow advances to Step 3 S3. If the cooling water temperature Tw is less than the predetermined value, a decision is made that warm-up of the engine is not complete, and the process flow ends.

In Step 3 S3, a determination is made as to the driving condition based on the detected engine rotational speed Ne and basic fuel injection pulse width Tp. In other words, it is determined whether the engine is within a low load region. To this end, a region to be used as the low load region should be predetermined in advance within a driving region which involves engine rotational speed Ne and basic fuel injection pulse width Tp as parameters. Here, because the temperature inside the combustion chamber 61 varies depending on the engine specifications, the material used for the coating layer 55 and the cylinder liner 56, and their thickness, the boundary between the low load region and the high load region needs to be established appropriately.

When the driving condition is within the predetermined low load region, the process flow advances to Step 4 S4. If the driving condition is not within the low load region, the process flow advances to Step 7 S7.

In Step 4 S4, the cylinder wall temperature Twall detected by the wall temperature sensor 74 is compared with a predetermined value. Here, the predetermined value is the minimum cylinder temperature value at which combustion does not deteriorate without heat recovery, and it is set appropriately in advance. When the cylinder wall temperature Twall is less than or equal to the predetermined value, a decision is made that heat needs to be recovered from the wall surface of cylinder 10. Accordingly, the process flow advances to Step 5 S5. If the cylinder wall temperature Twall is greater than the predetermined value, the process flow advances to Step 7.

In Step 5 S5, an instruction to minimize the lift of the intake valves 31 is given to the first hydraulic device 36. The process then proceeds to Step 6 S6. In Step 6 S6 an instruction to delay the phase of the lift center angle of the intake valves 31 (that is, the timing for closing the intake valves) is given to the second hydraulic device 45 to open the intake valves 31 approximately at top dead center TDC and close them at a crank angular position ahead of bottom dead center BDC, as shown in FIG. 4B. As a result, the intake air is turned into the high-speed wall flow 65 along the wall surface of the cylinder 10 to recover heat from the wall surface of the cylinder 10, as shown in FIG. 6A.

Conversely, when the driving condition is not within the low load region, that is, when the driving condition is within the high load region, a decision is made that there is no need to recover heat from the wall surface of cylinder 10. Thus, the process flow proceeds to Step 7 S7. At Step 7 S7, an instruction to increase the lift of the intake valves 31 is given to the first hydraulic device 36 by the engine control unit 39. The process flow the proceeds to Step 8 S8. At Step 8 S8, an instruction to delay the phase of the lift center angle (that is, the timing for closing the intake valves) is given to the second hydraulic device 45 to reduce the wall flow along the wall surface of cylinder 10 and turn it into wall flow 66 that does not flow along the wall surface of cylinder 10, as shown in FIG. 6B, to avoid heat recovery from the wall surface of the cylinder 10. In this manner, a reduction of filling efficiency may be avoided, as well as knocking due to an intake air temperature increase at high load.

However, when the driving condition is within the low load region but the cylinder wall temperature Twall exceeds the predetermined value, a decision is also made that there is no need to recover heat from the wall surface of cylinder 10. In this case, the process flow also advances from Step 4 S4 to Steps 7 S7 and 8 S8. That is, an instruction to increase the lift of the intake valves 31 is given to the first hydraulic device 36, and an instruction to delay the phase of the lift center angle of the intake valves 31 is given to the second hydraulic device 45 to lessen the wall flow along the wall surface of the cylinder 10 and turn it into the wall flow 66 that does not flow along the wall surface of cylinder 10, as shown in FIG. 6B. This prevents heat recovery from the wall surface of cylinder 10 to prevent filling efficiency reduction and knocking due to an intake air temperature increase under a condition in which the cylinder wall temperature exceeds the predetermined value, even in the low load region.

Although it is stated above that the lift of the intake valves 31 is minimized in Step 5 S5, or the lift of the intake valves 31 is increased in Step 7 S7, the actual extent needs to be determined appropriately depending on the engine specifications. In such cases, because the intensity and orientation of the flow along the cylinder wall are affected by the timing of closing the intake valves, the extent of the lift center angle phase advancement for the intake valves 31 in Step 6 S6 and the extent of the lift center angle phase delay for the intake valves 31 in Step 8 S8 also need to be optimally determined.

As described above, according to the present embodiment, in an engine having the intake valves 31 for opening and closing the intake ports which open into combustion chamber 61, the variable valve operating mechanisms 21 and 41 for variably controlling the lift of the intake valves 31 are provided, and the lifting of intake valves 31 is minimized at a low load condition using the variable valve operating mechanism so as to set the timing for closing intake valves 31 ahead of bottom dead center BDC of the intake stroke (see Steps 3, 5, and 6 in FIG. 8). The lifting of the intake valves 31 is increased relatively while at a high load condition so as to bring the timing for closing the intake valves 31 close to bottom dead center BDC of the intake stroke (see Steps 3, 7, and 8 in FIG. 8). In this way, even when there is the risk of combustion deterioration due to a drop in the compression temperature that occurs when the actual compression ratio is reduced to reduce the pumping loss at low engine load, the combustion is improved through active heat exchange with the cylinder liner 56 (cylinder 10) and by creating an intake air flow characteristic that limits heat exchange with cylinder liner 56 (cylinder 10) at high engine load, so that knocking and reduction of the filling efficiency at high engine load may be prevented.

According to the present embodiment, because the intake air is introduced into combustion chamber 61 along the wall surface of cylinder 10 (the wall surface of combustion chamber 61) when the lifting of intake valves 31 is reduced (see FIG. 6A), the heat can be efficiently recovered from the high-temperature cylinder 10.

According to the present embodiment, because the crown surface of the piston 9 (coating layer 55) and the cylinder liner 56 (part of the wall surface of combustion chamber 61) are made of a ceramic material with effective heat insulating and heat retaining properties, cooling losses can be reduced to improve the thermal efficiency of the engine at a low load condition.

According to the present embodiment, because the wall temperature sensor 74 for detecting the wall temperature of the wall surface of the cylinder 10 (wall surface of the combustion chamber) is provided and because lifting of the intake valves 31 is increased when the wall temperature Twall of cylinder 10 detected by the wall temperature sensor 74 at a low load condition is higher than a predetermined value (see Steps 3, 4, and 7 in FIG. 8), filling efficiency reduction and knocking that are due to an increased intake air temperature under a condition in which cylinder wall temperature Twall exceeds the predetermined value can be prevented even in the low load region.

FIG. 9B is a perspective partial cutaway view showing schematically a piston 9 in a second embodiment, wherein the structures of piston 9 and a cylinder liner 71 are shown. Conventional structures of the piston 9 and the cylinder liner 10 are shown in FIG. 9A, for the purpose of comparison.

Referring specifically to FIG. 9B, the cylinder liner 71 is formed with a gradient using a composite material. In other words, the cylinder liner 71 is divided roughly in half to form an upper liner part 71a and a lower liner part 71b. The upper liner part 71a is positioned next to the piston 9 at top dead center as is heat insulating. The lower liner part 71b is positioned next to the piston at bottom dead center and is a high heat conduction/heat transfer area. That is, the upper liner part 71a has a heat insulating structure which may be made primarily of a ceramic material. The lower liner part 71b has a heat conduction structure which may be made of a carbon nano-tube material. The lower line part 71b has the heat conduction structure coated partially on or blended with the inner circumferential surface of lower liner part 71b and the piston slides against this material to increase the heat conduction/heat transfer rate near bottom dead center. In this case, because placement of the boundary between the upper liner part 71a and the lower liner part 71b varies depending on individual engine specifications, it is determined accordingly.

In this second embodiment, the characteristic that the coating layer 55 is formed to a prescribed thickness on the crown surface of piston 9 using a heat insulating (nonmetallic) material such as a ceramic material is identical to that which was described above in the first embodiment.

When cylinder liner 71 is formed with a gradient using a composite material in this way, the piston rings of piston 9 can be cooled at the bottom dead center end, so that lubrication problems can be prevented; in other words, sticking (adhesion) of piston 9 to the wall surface of the cylinder (cylinder liner 71) due to the coking that occurs when the piston rings reach a high temperature can be prevented even when the surface temperature of upper liner part 71a has increased.

As described above, according to the second embodiment, the wall surface of the combustion chamber 61 (the wall surface of cylinder 10) is cylinder liner 71. The upper liner part 71a of the cylinder liner 71 next to the piston 9 at the top dead center end is made of a highly heat insulating material. The lower liner part 71b next to piston 9 at the bottom dead center end is made of a highly heat conductive material. In this way, the piston rings of piston 9 can be cooled at the bottom dead center end, so that a lubrication problem, that is, sticking (adhesion) of piston 9 to the wall surface of cylinder liner 71 due to the coking that occurs when the piston rings reach a high temperature, can be prevented even when the liner surface temperature next to piston 9 at top dead center has increased.

Although an example has been explained in the above embodiments in which the wall surfaces (piston 8, cylinder 10, cylinder head 62 (see FIG. 7A), intake valves 31, and exhaust valves 63) of the combustion chamber 61 were partially made of a material with effective heat insulating and heat retaining properties, the entire wall surface of combustion chamber 61 may also be made of a material with effective heat insulating and heat retaining properties.

In addition, although the timing for closing intake valves 31 is set prior to bottom dead center BDC while at a low load condition in the embodiments, it goes without saying that the present invention may also be applied to a case in which it is set later than bottom dead center BDC, also.

The preceding description has been presented only to illustrate and describe exemplary embodiments of the exhaust system according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An engine intake control apparatus for an engine that comprises at least one combustion chamber operatively connected to an intake port and an intake valve associated with each intake port, wherein the intake valve is adapted to open and close the intake port, the intake control apparatus comprising:

*a* variable valve operating mechanism configured and arranged to selectively change a valve closing timing and a valve lift amount of the intake valve; and

*a* controller configured and arranged to control the variable valve operating mechanism [when the engine is in a low load condition, wherein], *the controller using the variable valve operating mechanism to set* the valve closing timing [is determined] *of the intake valve* such that an actual compression ratio of the engine is reduced relative to the actual compression ratio when the engine is operating in a high load condition *upon detecting that the engine is in a low load condition and that a temperature of a combustion chamber wall is less than or equal to a predetermined value*, and

[wherein] *the controller using the variable valve operating mechanism to set* the valve lift amount [is] *of the intake valve to be* smaller [when the engine is in the low load condition] relative to the valve lift amount *of the intake valve set by the controller* when the engine is in the high load condition *upon detecting that the engine is in the low load condition and that the temperature of the combustion chamber wall is less than or equal to the predetermined value*.

2. The intake control apparatus as described in claim 1, wherein at least a portion of [the] wall surfaces of the combustion chamber *wall* is made of a heat insulating material.

3. The engine intake control apparatus as described in claim 2, wherein the heat insulating material is a ceramic material.

4. The engine intake control apparatus as described in claim 2, wherein the heat insulating material is coated on a cylinder liner of the engine.

5. The engine intake control apparatus as described in claim 1, wherein

[a cylinder wall that forms part of] the combustion chamber *wall* has *a first liner part positioned next to a piston at a top dead center side with the first liner part having* a lower thermal conductivity than a [portion of the cylinder wall] *second liner part positioned next to the piston* at a bottom dead center side.

6. The engine intake control apparatus as described in claim 5, wherein

[a top dead center side of the cylinder wall] *the first liner part* is constructed of a first material, and the [bottom dead center side of the cylinder wall] *second liner part* is constructed of a second material, and

[wherein] the first material is a heat insulating material and the second material is a conductive material.

7. The engine intake control apparatus as described in claim 5, wherein

[a] *the* first [cylinder] liner [forms the top dead center side of the cylinder wall and] *part* is constructed of [the] *a* first material and [a] *the* second [cylinder] liner [forms the bottom dead center side of the cylinder wall and] *part* is constructed of [the] *a* second material *that is different from the first material*.

8. The engine intake control apparatus as described in claim 1, wherein

*the controller reduces* the valve lift amount of the intake valves [is reduced sufficiently to let] *thereby letting* an intake air flow [into the combustion chamber] along [the] wall surfaces of the combustion chamber *wall* when the engine is in the low load condition.

9. The engine intake control apparatus as described in claim 1, wherein

*the controller sets* the valve closing of the intake valves [is set] to occur prior to the bottom dead center of an intake stroke when the engine is operating in the low load condition, thereby reducing the actual compression ratio.

10. The engine intake control apparatus as described in claim 1, wherein the variable valve operating mechanism comprises a variable lift mechanism that selectively varies the valve lift amount of the intake valves, and a variable valve closing timing mechanism that selectively varies the valve closing timing of the intake valves.

11. The engine intake control apparatus as described in claim 1, wherein when the engine is in [a] *the* low load condition, the valve lift amount of the intake valve is increased *by the controller* when [a] *the* temperature of [a] *the* combustion chamber wall exceeds [a] *the* predetermined temperature as compared to when the temperature of the combustion chamber wall is lower than the predetermined temperature.

12. The engine intake control apparatus as described in claim 1, wherein when the engine is in the high load condition, the controller actuates the variable valve operating mechanism to increase the valve lift amount of the intake valves so as to alleviate intake air flow from flowing along [the] wall surfaces of the combustion chamber *wall*.

13. A method for controlling an engine that comprises at least one combustion chamber that is operatively connected to an intake port through an intake valve that selectively and variably opens and closes the intake port, the method comprising:

detecting an engine operational condition to determine whether the engine is in a low load condition; [and]

actuating an intake valve with a valve closing timing and a valve lift amount when the engine is in the low load condition;

[wherein] *setting* the valve closing timing [is determined such that] *of the intake valve to reduce* an actual compression ratio of the engine [is reduced] relative to the actual compression ratio of the engine [with] *when* the engine is in a high load condition *upon detecting that the engine is in the low load condition and that a temperature of a combustion chamber wall is less than or equal to a predetermined temperature*; and

[wherein] *setting* the valve lift amount [is] *of the intake valve to be* smaller [when the engine is in a low load condition] relative to the valve lift amount *of the intake valve* when the engine is in the high load condition *upon detecting that the engine is in the low load condition and that the temperature of the combustion chamber wall is less than or equal to the predetermined temperature*.

14. The method for controlling the engine as described in claim 13, wherein when [a] *the* temperature of [a] *the* combustion chamber wall exceeds [a] *the* predetermined temperature, the valve lift amount is increased relative to the valve lift amount when the temperature of the combustion chamber wall is lower than the predetermined temperature.

15. An intake control apparatus for an engine that comprises at least one combustion chamber operatively connected to an intake port and an intake valve associated with each intake port, wherein the intake valve is adapted to open and close the intake port, the intake control apparatus comprising:

variable valve operating means for selectively changing a valve closing timing and a valve lift amount of the intake valve; and control means for controlling the variable valve operating means [when the engine is in a low load condition, wherein]

*to set* the valve closing timing [is determined] *of the intake valve* such that an actual compression ratio of the engine is reduced relative to the actual compression ratio when the engine is operating in a high load condition *upon detecting that the engine is in a low load condition and that a temperature of a combustion chamber wall is less than or equal to a predetermined value*, and

[wherein] *to set* the valve lift amount [is] *of the intake valve to be* smaller [when the engine is in a low load condition] relative to the valve lift amount *of the intake valve set by the control means* when the engine is in the high load condition *upon detecting that the engine is in the low load condition and that the temperature of the combustion chamber wall is less than or equal to the predetermined value*.

* * * * *